United States Patent
Hanisch et al.

(10) Patent No.: US 9,162,820 B2
(45) Date of Patent: Oct. 20, 2015

(54) CONVEYOR DEVICE WITH IMPROVED ADHESIVE PROPERTIES

(71) Applicant: Robert Bosch GmbH, Stuttgart (DE)

(72) Inventors: Markus Hanisch, Fellbach (DE); Laura Boehm, Sindelfingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 14/398,537

(22) PCT Filed: May 2, 2013

(86) PCT No.: PCT/EP2013/059119
§ 371 (c)(1),
(2) Date: Nov. 3, 2014

(87) PCT Pub. No.: WO2013/164391
PCT Pub. Date: Nov. 7, 2013

(65) Prior Publication Data
US 2015/0107963 A1   Apr. 23, 2015

(30) Foreign Application Priority Data
May 3, 2012   (DE) .......................... 10 2012 207 321

(51) Int. Cl.
| *B65G 15/58* | (2006.01) |
| *B65G 15/42* | (2006.01) |
| *B65G 15/16* | (2006.01) |
| *B65G 15/22* | (2006.01) |

(52) U.S. Cl.
CPC ................ *B65G 15/58* (2013.01); *B65G 15/16* (2013.01); *B65G 15/22* (2013.01); *B65G 15/42* (2013.01); *B65G 2201/0235* (2013.01)

(58) Field of Classification Search
CPC ........ B65G 15/42; B65G 15/44; B65G 15/58; B65G 2207/02; B65G 15/22; B65G 15/16
See application file for complete search history.

(56) References Cited

U.S. PATENT DOCUMENTS

| 8,153,254 | B2 | 4/2012 | Arzt |
| 8,192,901 | B2 | 6/2012 | Kageyama |
| 8,377,542 | B2 * | 2/2013 | Xie et al. ...................... 428/166 |
| 2008/0169003 | A1 | 7/2008 | Curtis |
| 2009/0145558 | A1 * | 6/2009 | Saluz ............................ 156/530 |
| 2010/0059163 | A1 * | 3/2010 | Till ................................ 156/60 |

(Continued)

FOREIGN PATENT DOCUMENTS

| DE | 10145931 | 4/2003 |
| DE | 202008004820 | 8/2008 |

(Continued)

OTHER PUBLICATIONS

International Search Report for Application No. PCT/EP2013/059119 dated Sep. 10, 2013 (English Translation, 2 pages).

*Primary Examiner* — Leslie A Nicholson, III
*Assistant Examiner* — Keith R Campbell
(74) *Attorney, Agent, or Firm* — Michael Best & Friedrich LLP

(57) ABSTRACT

A conveyor device includes a conveyor belt with a surface oriented towards the outer face of the conveyor belt. The surface has a plurality of microstructures with protruding regions such that an object adheres to the surface when the object comes into contact with the surface on the basis of the resulting van der Waals forces.

7 Claims, 4 Drawing Sheets

(56) References Cited

U.S. PATENT DOCUMENTS

| | | |
|---|---|---|
| 2010/0133071 A1 | 6/2010 | Schmitt et al. |
| 2012/0009854 A1 | 1/2012 | Darcangelo et al. |
| 2012/0118506 A1* | 5/2012 | Kim et al. .................. 156/367 |
| 2013/0340946 A1* | 12/2013 | Frank et al. .................. 156/540 |
| 2013/0341164 A1* | 12/2013 | Frank et al. .................. 198/846 |
| 2014/0318700 A1* | 10/2014 | Henderson et al. ........... 156/249 |

FOREIGN PATENT DOCUMENTS

| | | | |
|---|---|---|---|
| DE | 102007062844 | | 6/2009 |
| DE | 102008053619 | | 5/2010 |
| DE | 102010042753 | * | 4/2012 |
| DE | 102010042753 A1 | * | 4/2012 |
| EP | 1367027 | | 12/2003 |
| JP | 4168064 | | 6/1992 |

* cited by examiner

CONVEYOR DEVICE WITH IMPROVED ADHESIVE PROPERTIES

BACKGROUND OF THE INVENTION

The present invention relates to a conveyor belt with improved adhesive properties as well as to a conveyor arrangement comprising such a conveyor belt.

In the technical field, conveyor belts are used in different fields of application. One field of application is, for example, the delivery and discharge of products at different machines, for example packaging and/or filling machines or the like. In this case, the conveyor belts are always adapted to the geometry and size of the products to be conveyed. This approach however results in the need for a frequent format change when changes in the shape and/or size of the products to be conveyed occur. Besides the resulting set-up times, said format changes lead to an undesirable machine down time. In addition, problems contingent on installation space can ensue, so that the required conveyor belts cannot always be arranged in optimal supply positions. A molded body is known from the German patent specification DE 10 2008 053 619 A1, which has a hierarchical structure consisting of first and second threads. As a result, the molded body can be used as an adhesive device which is employed as adhesive tapes, patches or as the surface of parts of a robot. The German patent specification DE 10 2007 062 844 A1 furthermore discloses a conveyor device for transporting bottles in compartments with a circulating chain and driving dogs for moving the compartments, wherein adhesive means having Gecko structures are provided on the driving dogs, said Gecko structures being formed by a plurality of micro-protrusions on the driving dogs.

SUMMARY OF THE INVENTION

The inventive conveyor belt has in contrast the advantage that a high degree of flexibility can be maintained during format changes of products. According to the invention, the products can furthermore be conveyed on the conveyor belt without elaborate additional structures. This is achieved according to the invention by virtue of the fact that the conveyor belt has a surface which is oriented towards the outer face and comprises a plurality of microstructures. The microstructures comprise protruding regions such that an object, e.g. a product to be conveyed, adheres to the surface when the object comes into contact with the surface on the basis of the resulting van der Waals forces. In so doing, any desired conveying tasks can be facilitated by the conveyor belt according to the invention, in particular even an overhead transport or a lateral transport, independently of the surface of the product.

The conveyor belt is preferably a circulating conveyor belt having a first and a second deflection element, which, in particular, are designed as deflection rollers and deflect the conveyor belt by 120 degrees, preferably by 180 degrees. In particular in the case of the deflection about an angle of 180 degrees, an automatic removal of the product from the conveyor belt can be implemented.

In a particularly preferred manner, the conveyor belt has a multilayer structure. In this connection, the conveyor belt preferably comprises a supporting belt, an outer layer comprising an applied microstructure and a flexible layer, which is disposed between the supporting belt and the outer layer. As a result, a conveyor belt comprising an adaptable surface is provided, which can adapt itself to a wide range of geometric shapes of products, e.g. a rectangular shape, bottle shape, spherical shape, etc. In a particularly preferable manner, the flexible layer is a liquid layer consisting of a magnetorheological fluid or the flexible layer is a gel-like layer, preferably comprising a magnetorheological gel. The advantage of the magnetorheological liquid or the magnetorheological gel is that the layer, due to the flexibility thereof, can adapt itself to any geometry of the object to be transported and can then maintain this shape when a magnetic field is applied as a result of the flexible layer stiffening. In so doing, particularly a partial enclosure of objects with arbitrary geometries is possible. In particular, round objects can also be partially enclosed, whereby grippers or driving dogs or the like can possibly be omitted.

The protruding regions of the microstructure on the conveyor belt preferably have a length between 1 μm and 1000 μm. In a particularly preferable manner, the protruding regions have different lengths. The protruding regions are furthermore preferably arranged in conformity with a plurality of longitudinal lamellae. In a further preferable manner, the protruding regions on the surface are designed as hair-like projections.

According to a further embodiment of the invention, a conveyor arrangement is proposed, which comprises an inventive conveyor device as well as a transfer device. The transfer device is equipped to transfer a product to the first conveyor belt such that the product can be pressed against the surface of the conveyor belt with a specified force. It is thereby ensured that the product is transferred with a sufficient amount of force and reliably adheres to the conveyor belt and that the plurality of microstructures is able to provide the respective required van der Waals forces.

The conveyor arrangement as a transfer device preferably comprises a second conveyor belt, which is arranged below the first conveyor belt and vertically and horizontally offset to the first conveyor belt. This results in an overlapping product transfer region, wherein a vertical distance between the first and second conveyor belt is selected in such a way that a product can be transferred with a specified force from the second conveyor belt onto the first conveyor belt. A simply constructed and cost effective transfer device can thus be provided. In addition, the transfer force can be easily adjusted by, for example, the first and/or the second conveyor belt being furnished with a different tension.

According to a preferred alternative, the transfer device for the conveyor belt arrangement comprises a second and a third conveyor belt. In so doing, the second conveyor belt is disposed serially with respect to the first conveyor belt, i.e. the second conveyor belt is disposed serially upstream of the first conveyor belt, and the third conveyor belt is disposed parallel to the first and second conveyor belt. The third conveyor belt thereby overlaps at least partially the first as well as the second conveyor belt. A transfer of a product is therefore implemented in such a way that the product is initially clamped between the second and third conveyor belt and is conveyed in the direction of transport and is then transferred from the second conveyor belt to the first conveyor belt, wherein the product is initially still clamped between the second and third conveyor belt and then between the third and the first conveyor belt. By means of the clamping action, a pressing force is exerted from the third conveyor belt onto the product and against the first conveyor belt, and the required van der Waals forces are therefore produced between the product and the first conveyor belt. In a particularly preferable manner, the first, second and third conveyor belt are thereby disposed in such a way that a lateral product transfer results. In particular, the three conveyor belts are thereby substantially vertically disposed, in an especially preferred manner exactly vertically disposed.

The present invention further relates to the use of a microstructured surface comprising a plurality of protruding regions, which protrude in a range of 1 to 1000 μm, on a conveyor belt of a conveyor device. According to the invention, it is therefore proposed for the first time to use such microstructures on a conveyor belt, whereby many surprising advantages ensue when meeting the conveying aims with conveyor belts.

BRIEF DESCRIPTION OF THE DRAWINGS

Preferred exemplary embodiments of the invention are described below in detail with reference to the accompanying drawings. In the drawings.

DETAILED DESCRIPTION

Figure 1:
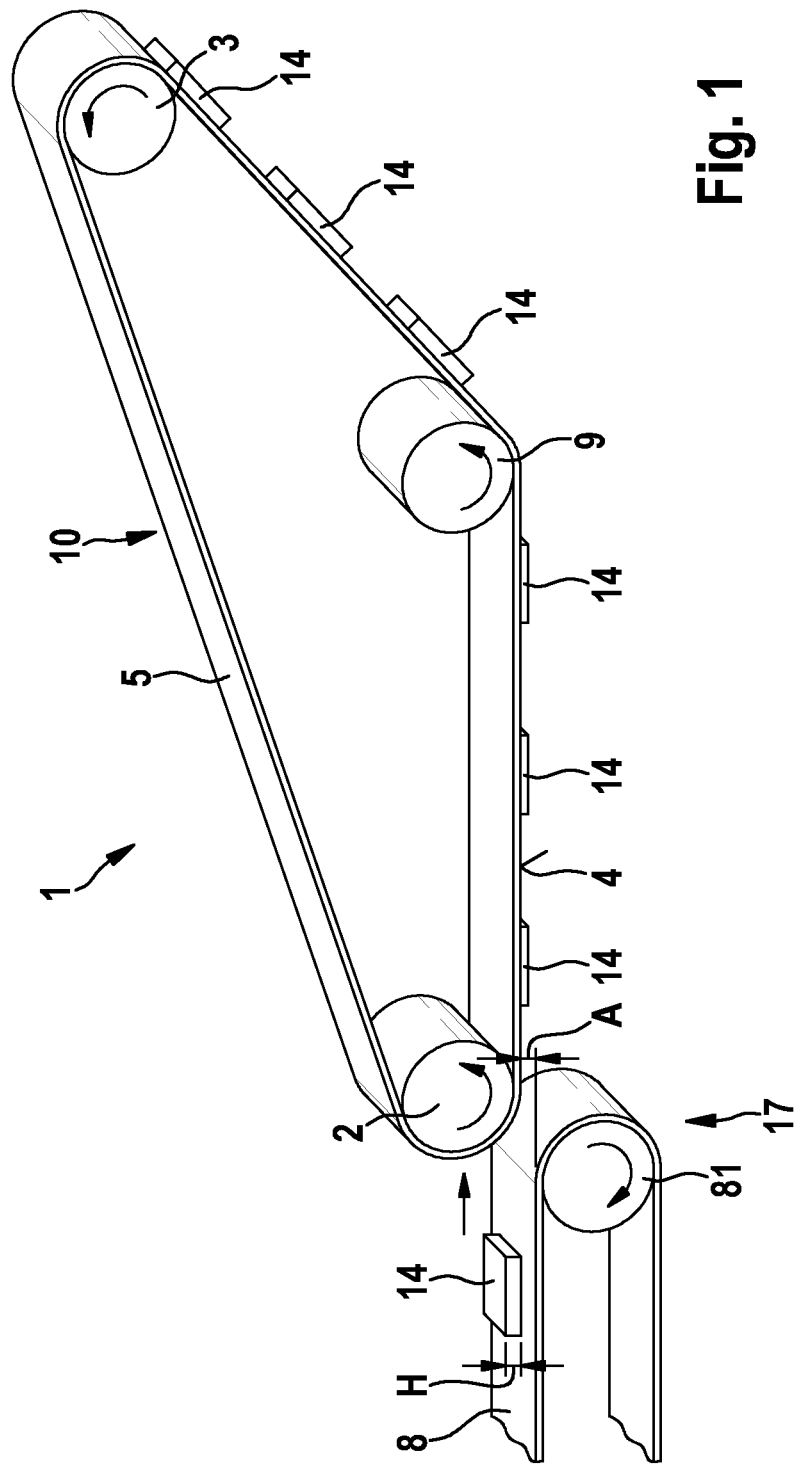
FIGS. 1 to 6 show schematic, perspective views of conveyor belts pursuant to a first to sixth exemplary embodiment.
Figure 2:
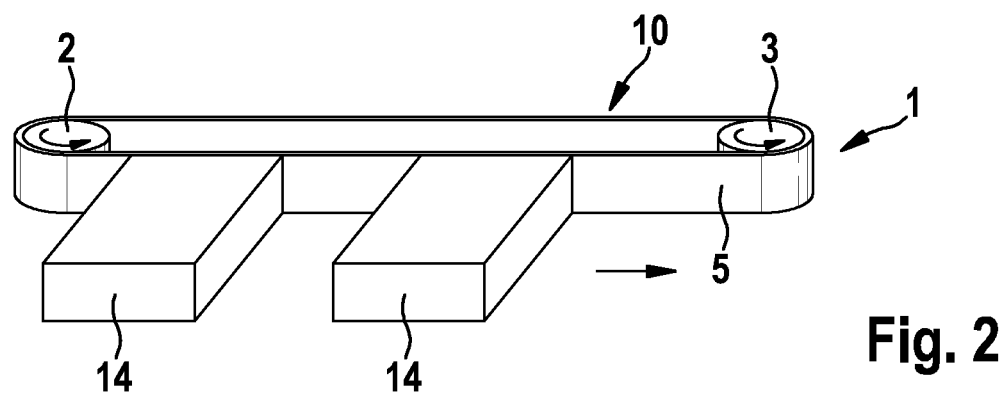

A conveyor device 1 comprising a conveyor belt 10 according to the invention is described below with reference to FIG. 1. The conveyor device 1 further comprises a first and a second deflection roller 2, 3 as well as a tensioning roller 9. The circulating conveyor belt 10 has a plurality of microstructures 5 on a surface oriented towards the outer face, said microstructures comprising a plurality of protruding regions in the micrometer range (between 1 and 1000 μm). The reference sign 8 designates an infeed conveyor belt with which products 14 are delivered to the conveyor device 1 according to the invention.

By means of the microstructures 5 on the surface 4 of the conveyor belt 10, objects can adhere to the surface of the conveyor belt 10 on the basis of the van der Waals forces occurring between the object and the microstructures. This results in a sufficient holding force due to the plurality of protruding regions (several millions). Although each protruding region provides only a tiny holding force, the sum of all of the tiny holding forces makes it possible to transport a product in a headfirst manner, as shown in FIG. 1.

A transfer of the product 14 from the infeed conveyer belt 8 onto the conveyor belt 10 occurs thereby at a product transfer region 17 in such a way that a vertical distance A between the deflection roller 81 and the first deflection roller 2 at the deflection roller 81 is minimally smaller than a product height H; thus enabling a pressing force to be generated between the two deflection rollers when the product is passing through said rollers. As a result, the product 14 adheres especially well to the conveyor belt 10.

According to the invention, a conveyance of products 14 can therefore be enabled at a lower run of the conveyor belt 10, whereby the conveyor belt does not have to be changed, in particular during format changes. The inventive conveyor device 1 can therefore be used for a wide range of products, even if said products have different sizes and/or different geometries. In addition, transfers of products 14 from bottom to top can particularly be facilitated using the present invention. Furthermore, particularly the flexibility in positioning the inventive conveyor device is also considerably simplified, in particular in combination with filling and/or packaging machines.

In the exemplary embodiments described below, identical or functionally identical components are denoted with the same reference signs as in the first exemplary embodiment.

An arrangement of the circulating conveyor belt 10 in the vertical direction is provided in the second exemplary embodiment of the inventive conveyor device 1. Products 14 can thereby be laterally conveyed. In this case, the surface of the conveyor belt again has a plurality of microstructures 5 so that the products adhere to the surface.

Figure 3:
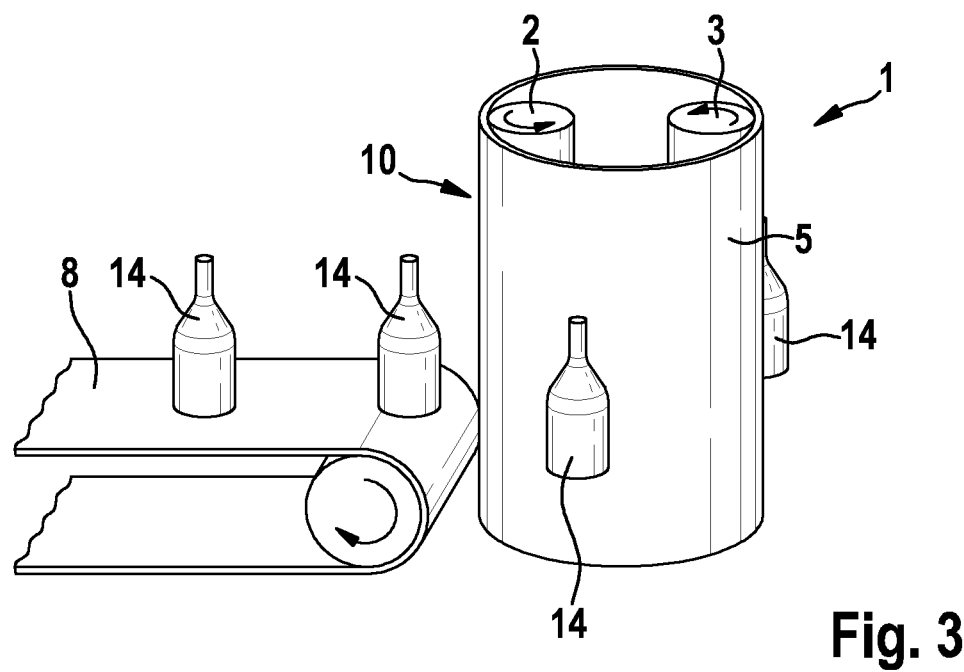

In the third exemplary embodiment shown in FIG. 3, the conveyor belt 10 is oriented in the vertical direction as in the second exemplary embodiment, wherein bottles are transported as products in this exemplary embodiment. The bottles are reliably conveyed here in the upright position. A pressing force results from the transport speed of the products 14 by means of the infeed conveyor belt 8.

Figure 4:
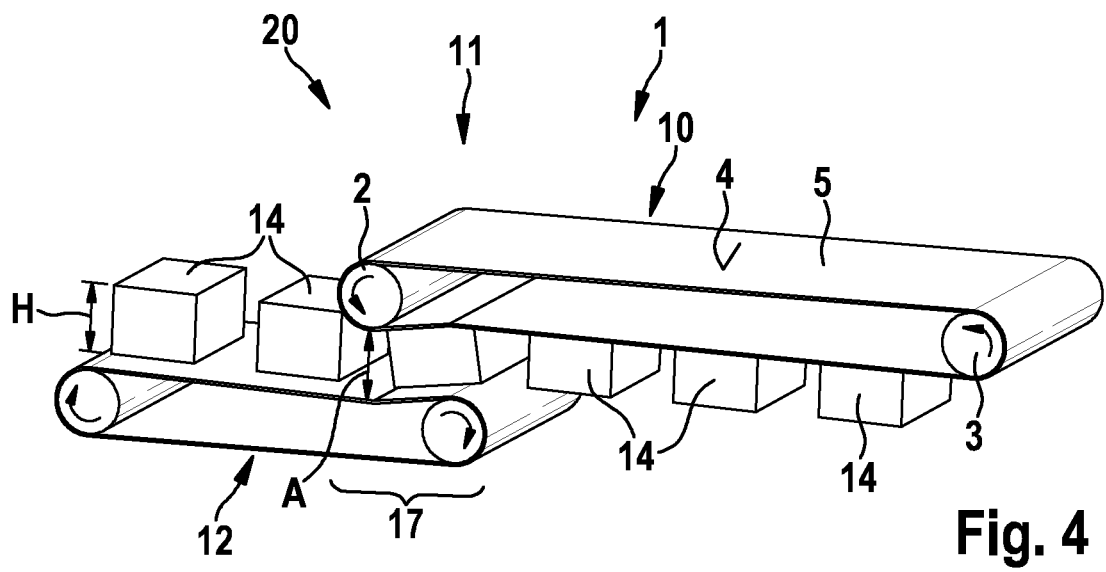

FIG. 4 shows a conveyor device 1 according to a fourth exemplary embodiment of the invention. The conveyor device 1 of the fourth exemplary embodiment comprises an inventive conveyor belt 10 as well as a transfer device 11. The transfer device 11 comprises a second conveyor belt 12 in the fourth exemplary embodiment. The second conveyor belt is disposed below the first conveyor belt 10 and is additionally horizontally offset to the first conveyor belt 10. As a result, an overlapping product transfer region 17 is maintained in which the first conveyor belt 10 and the second conveyor belt 12 are disposed one above the other. A distance A between the first and second conveyor belt is hereby smaller than a maximum product height H. This ensures that a pressing force is exerted on the product 14 by the second conveyor device 20 when the product 14 is conveyed into the product transfer region 17. As a result, the product 14 adheres better to the surface 4 of the first conveyor belt 10, which surface is furnished with microstructures 5. Thus, a reliable transfer of the products 14 from the upper run of the second conveyor belt 12 onto the lower run of the first conveyor belt 10 is achieved by means of the transfer device 11.

Figure 5:
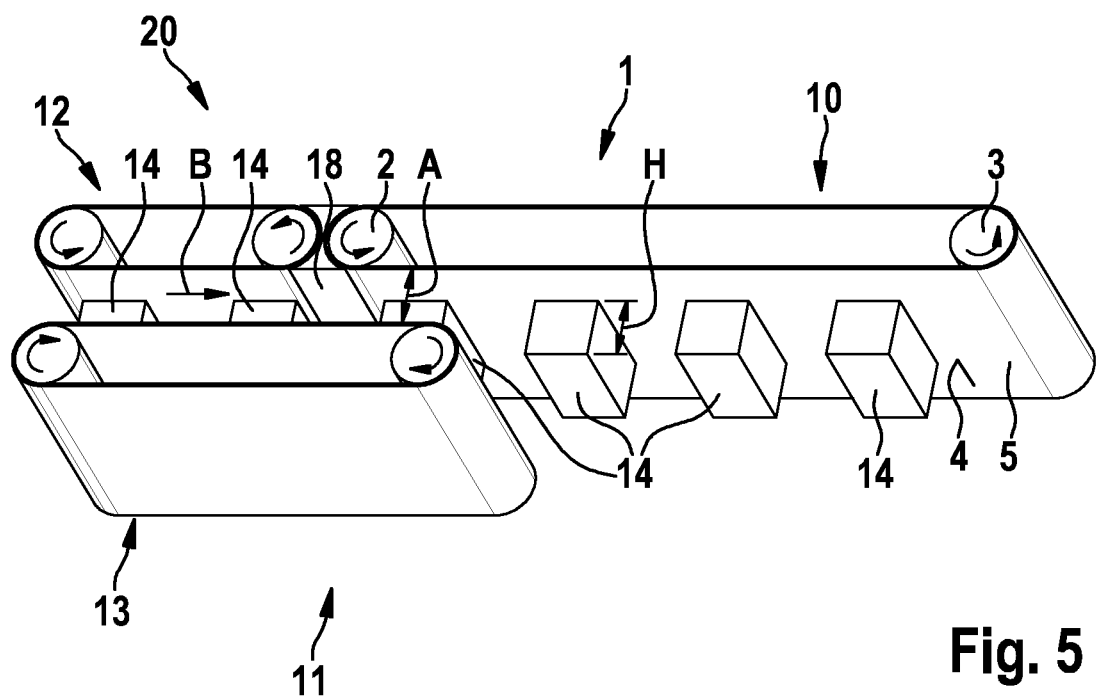

FIG. 5 shows a conveyor device 1 pursuant to a fifth exemplary embodiment of the invention. The fifth exemplary embodiment also comprises a transfer device 11 for transferring the products 14 onto the first conveyor belt 10. The transfer device 11 comprises a second conveyor belt 12 and a third conveyor belt 13. The three conveyor belts 10, 12, 13 are disposed vertically so that a lateral transfer is possible. As can be seen in FIG. 5, the second conveyor belt 14 is disposed serially upstream of the first conveyor belt 10. The third conveyor belt 13 is disposed parallel to the first and second conveyor belt. In this connection, the third conveyor belt 13 overlaps at least partially the first as well as the second conveyor belt. A lateral overlap region thus results with the first conveyor belt 10 as well as with the second conveyor belt 12. The products are thereby conveyed between the second conveyor belt 12 and the third conveyor belt 13 by being clamped between the two conveyor belts in the direction of the arrow B. A bridging element 18 is disposed between the second conveyor belt 12 and the first conveyor belt 10, wherein the products 14 are pushed across the bridging element 18 by means of the third conveyor belt 13. In order to again press the products 14 with a specified force against the first conveyor belt 10, a distance A between the third conveyor belt 13 and the first conveyor belt 10 is selected smaller than a height H of the products 14. In so doing, a defined adherence of the products 14 to the surface 4 by means of the microstructures 5 on the first conveyor belt 10 is achieved. The conveyor belts 10, 12, 13 of the fifth exemplary embodiment are oriented exactly in the vertical direction. It should however be noted that the conveyor belts can also be tilted, i.e. can be disposed at any similar angle with respect to a horizontal plane.

Figure 6:
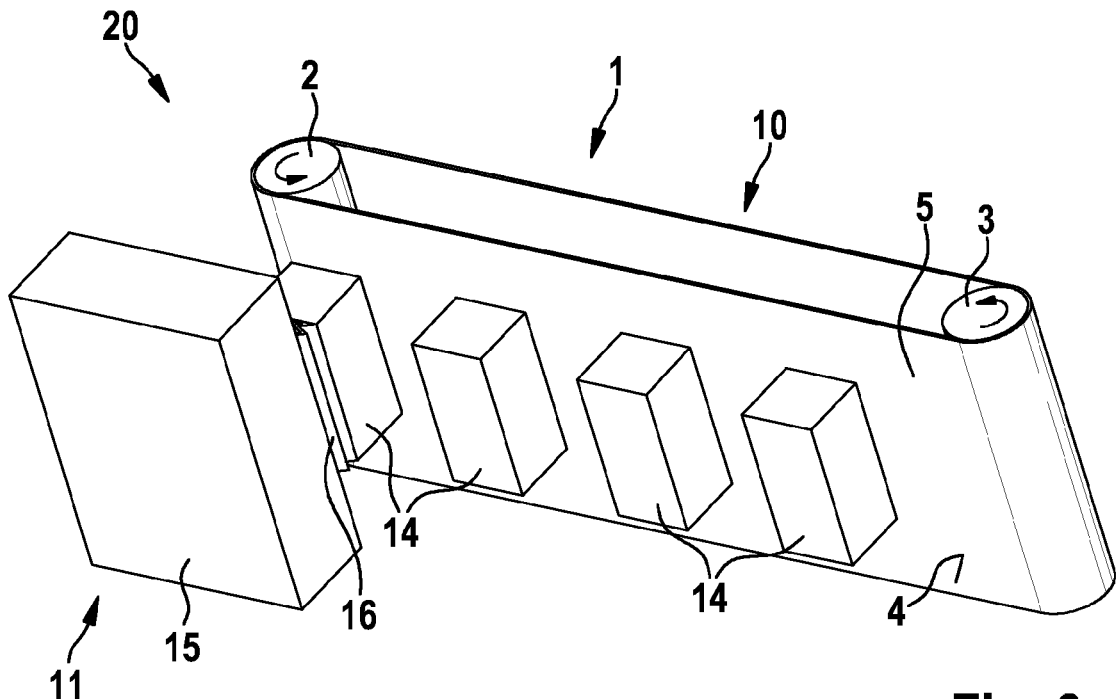

FIG. 6 shows a conveyor device 1 pursuant to a sixth exemplary embodiment of the invention. Said conveyor device 1 likewise comprises a transfer device 11 which is however an actuator in the sixth exemplary embodiment that actuates a pressing element 16. This enables the products 14 to be pressed with the aid of the pressing element 16 with a specified force against the vertically disposed conveyor belt 10. As a result, the products 14 adhere in turn very well to the surface of the conveyor belt 10, and a simple lateral transfer can be implemented.

Figure 7:
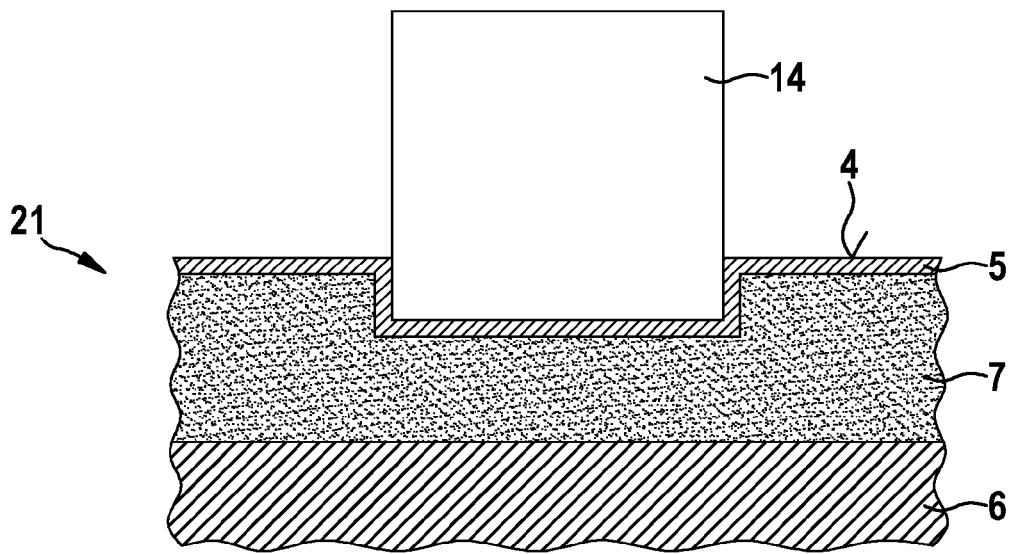
FIG. 7 shows a schematic cross-sectional view which illustrates an operating principle of an inventive conveyor belt comprising a microstructure and additionally comprising a flexible layer.

FIG. 7 shows a conveyor belt for a conveyor device pursuant to a seventh exemplary embodiment of the invention. In contrast to the conveyor belts 10 which are described in the preceding examples and have only an adhesive layer on the outer surface 4, based on the Gecko principle, this conveyor belt 21 has additionally another flexible layer 7 having magnetorheological properties. The flexible layer 7 is thereby disposed between the outer layer comprising microstructures 5 and a supporting belt 6. This enables the conveyor belt 21 to be capable of being better adapted to varying geometric shapes of the products 14, wherein, as is shown in FIG. 7, a partial enclosure of the product 14 is possible. By applying a magnetic field, the flexible layer can be stiffened and the product 14 reliably held. This enables in particular products having rounded or round external surfaces, as, e.g., bottles, to be better held.

It should be noted that a conveyor belt 21 as shown in FIG. 7 can also be used in all of the other preceding exemplary embodiments described above.

The invention claimed is:

1. A conveyor device, comprising:
   a conveyor belt having a multilayer structure, including a supporting belt, an outer layer comprising a plurality of microstructures, and a flexible layer disposed between the supporting belt and the outer layer,
   wherein the outer layer has a plurality of microstructures with protruding regions such that an object adheres to the outer layer when the object comes into contact with said outer layer on the basis of resulting van der Waals forces.

2. The conveyor device according to claim 1, characterized in that the conveyor belt is a circulating conveyor belt comprising at least one first deflection element and one second deflection element, and at least one of the first and second deflection elements deflect(s) the conveyor belt by at least 120 degrees.

3. The conveyor device according to claim 1, characterized in that the flexible layer is a liquid layer comprising a magnetorheological fluid.

4. The conveyor device according to claim 1, characterized in that the conveyor belt is a circulating conveyor belt comprising at least one first deflection roller and one second deflection roller, and at least one of the first and second deflection rollers deflect(s) the conveyor belt by at least 120 degrees.

5. The conveyor device according to claim 1, characterized in that the conveyor belt is a circulating conveyor belt comprising at least one first deflection roller and one second deflection roller, and at least one of the first and second deflection rollers deflect(s) the conveyor belt by at least 180 degrees.

6. The conveyor device according to claim 1, characterized in that the flexible layer is a gel-like layer.

7. The conveyor device according to claim 1, characterized in that the flexible layer is a magnetorheological gel.

* * * * *